(12) United States Patent
Fujishiro

(10) Patent No.: US 6,341,636 B1
(45) Date of Patent: Jan. 29, 2002

(54) PNEUMATIC TIRE WITH SIDE PORTIONS HAVING SPECIFIED INNER AND OUTER LAYER TAN δ

(75) Inventor: Shuichi Fujishiro, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/549,553

(22) Filed: Apr. 14, 2000

(30) Foreign Application Priority Data

Apr. 28, 1999 (JP) .......................................... 11-121810

(51) Int. Cl.$^7$ .......................... B60C 13/00; B60C 13/02
(52) U.S. Cl. ........................................ 152/523; 152/525
(58) Field of Search ................................ 152/525, 523, 152/524

(56) References Cited

U.S. PATENT DOCUMENTS 5,385,192 A * 1/1995 Hashimura et al. ..... 152/525 X

* cited by examiner

*Primary Examiner*—Adrienne C. Johnstone
(74) *Attorney, Agent, or Firm*—Rader, Fishman & Grauer, PLLC

(57) ABSTRACT

Disclosed is a pneumatic tire wherein a side portion is constituted by an inner layer, made of a compound showing tan δ(20° C.) 0.25 to 1.00, disposed on the outside of a carcass layer, and an outer layer, made of a compound showing tan δ(20° C.) 0.15 to 0.20, disposed on the outside of an inner layer.

5 Claims, 5 Drawing Sheets

PNEUMATIC TIRE WITH SIDE PORTIONS HAVING SPECIFIED INNER AND OUTER LAYER TAN δ

BACKGROUND OF THE INVENTION

The present invention relates to a pneumatic tire which improves attenuation properties without deteriorating cut resistance and weathering in a side portion thereof.

In pneumatic tires, particularly pneumatic tires for a competition such as a rally tire, which is used for a car running on a rough road such as a wasteland, a tire stiffness has been increased with an improvement of a car performance and an increase of a weight of the car.

Nevertheless, as the tire stiffness is increased, it becomes more difficult to attenuate impact applied to the tire from the ground at the time of rotations of the tire. Thus, this leads to a disadvantage that the tire vibrates, and ground contact properties, braking ability and driving stability are deteriorated.

Accordingly, although cut resistance and weathering can be improved by increasing the tire stiffness in a side portion thereof, it is practically impossible to improve attenuation properties.

SUMMARY OF THE INVENTION

The object of the present invention is to provide a pneumatic tire which is capable of improving attenuation properties without deteriorating cut resistance and weathering in a side portion thereof. By improving the attenuation properties, ground contact properties, braking ability and driving stability and the like are improved.

To achieve the above described object, in a pneumatic tire in which a carcass layer is provided in each of a pair of bead portions and a plurality of belt layers are arranged outside the carcass layer corresponding to a tread, the tire is loaded on a standard rim, a vertical distance from an end in a tire width direction in a region where a first belt layer among the belt layers disposed closest to the carcass layer and the carcass layer contact to each other to a position of a bead core center of the bead portion is set to H when internal pressure of 10% of the maximum air pressure is charged. A side portion occupying a region of 55 to 100% of H from the bead core center Q of the bead portion is constituted by an inner layer made of a compound showing tan δ(20° C.) 0.25 to 1.00, disposed on the outside of the carcass layer, and an outer layer made of a compound showing tan δ(20° C.) 0.15 to 0.20, disposed on the outside of the inner layer.

As described above, since the side portion is constituted by the inner layer and the outer layer, the above-described object can be achieved. Here, the standard rim and the maximum air pressure means the ones according to JATMA standard on 1999. "tan δ(20° C.)" is measured under conditions of temperature of 20° C., an initial strain of 10%, an amplitude of ±2% and a frequency of 20 Hz using a visco-elastic spectrometer. The compound means a rubber composition obtained by blending compounding agents such as sulfur and carbon black into rubber such as natural rubber, styrene-butadiene copolymer rubber and butadiene rubber according to demand.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
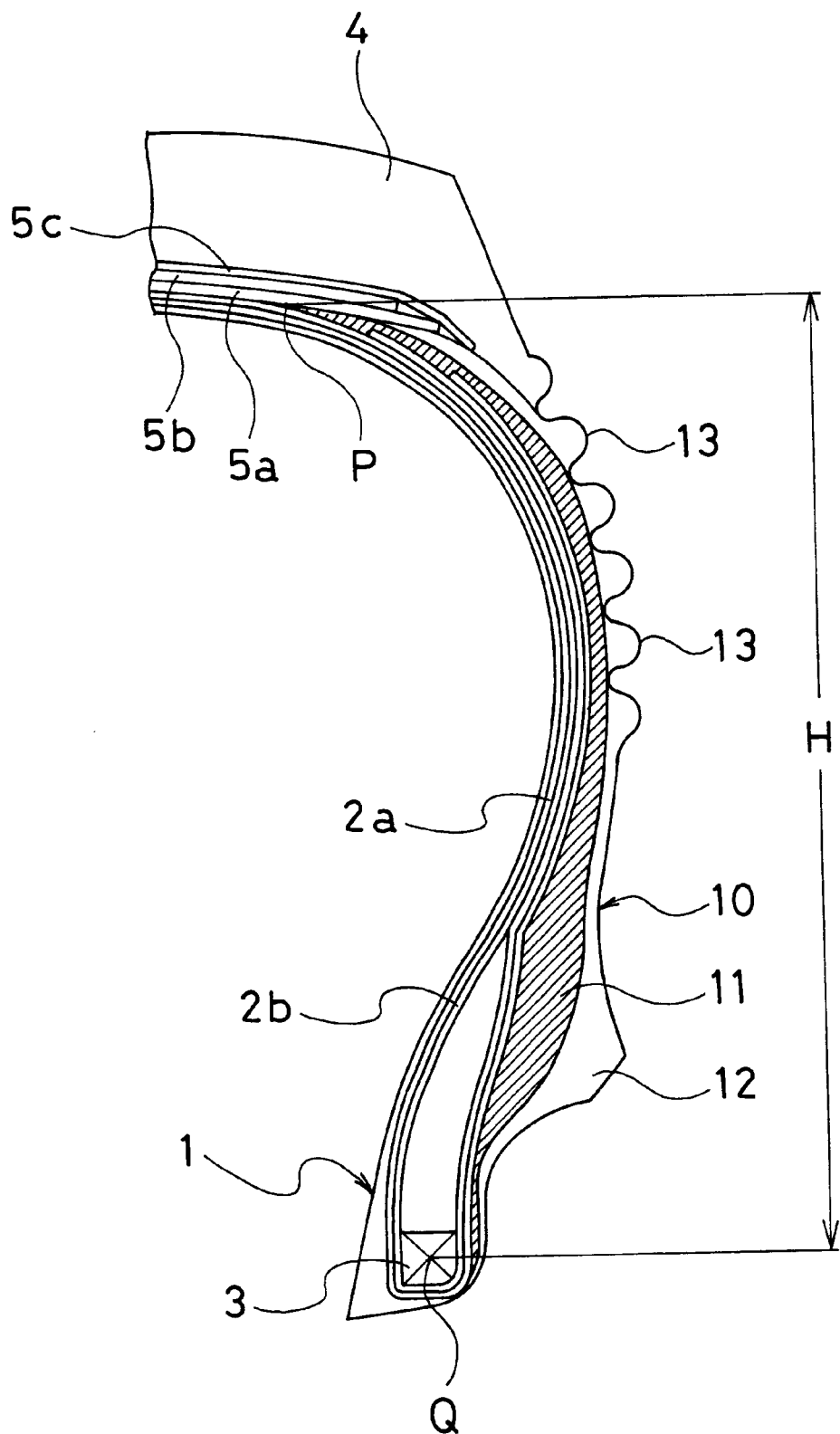
FIG. 1 is a semi-cross-sectional view in the meridian direction showing an example of a principal part of a pneumatic tire for a rally of the present invention.

FIG. 1 shows an example of a pneumatic tire of the present invention for a rally. In FIG. 1, carcass layers 2a and 2b are provided on a pair of bead portions 1 and 1 on the right and left sides of the tire, and an end of each of the carcass layers 2a and 2b is bent from the inside of the tire toward the outside thereof around the bead core 3 of the bead portion 1, and turned up. On the outside of the carcass layer 2b corresponding to a tread 4, disposed are three belt layers composed of first to three belt layers 5a, 5b and 5b, which are arranged in this order from the carcass layer 2b to the tread 4. The three layers are provided in the circumferential direction of the tire so as to surround the periphery of the tire.

In the pneumatic tire of the present invention for a rally, the tire is loaded on a standard rim, and internal pressure of 10% of the maximum air pressure is charged. At this time, a vertical distance from a position of the end P in the tire width direction in a region where the first belt layer 5a and the carcass layer 2b contact to each other to a position of a bead core center Q of the bead portion 1 is set to H. A side portion 10 extending at the region occupying 55 to 100% of H from the bead core center Q of the bead portion 1 is constituted by an inner layer 11 disposed on the outside of the carcass layer 2b and an outer layer 12 disposed on the outside of the inner layer 11. Note that the side portion 10 occupying the region of 100% of H from the bead core center Q is shown in FIG. 1.

The reason why the tire is loaded on the standard rim and the internal pressure is set to 10% of the maximum air pressure is that the value of this internal pressure is required to at least maintain a shape of the tire.

Figure 5:
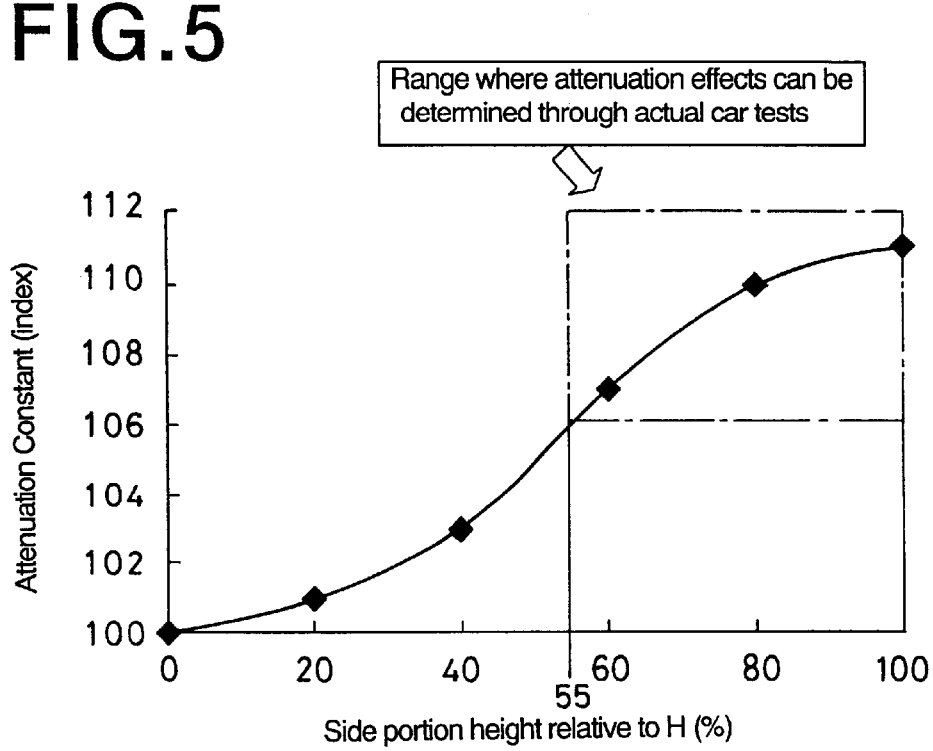
FIG. 5 is a graph showing a relation between an attenuation constant (exponent) and a height of a side portion (%) relative to a vertical distance H from a contact end of a belt layer with a carcass layer in a tire width direction, the belt layer being a first one among a plurality of belt layers provided between the carcass layer and a tread.

Moreover, the reason why the side portion 10 is provided so as to occupy 55 to 100% of H from the bead core center Q is as follows. If the side portion 10 occupies less than 55% of H from the bead core center Q, the arrangement of the internal layer 11 and the outer layer 12 is too one-sided to the bead portion 1, and the object of the present invention cannot be sufficiently achieved. A relation between a height (%) of the side portion relative to H and an attenuation constant (exponent) is shown in FIG. 5. As the attenuation constant is larger, an attenuation effect is higher. As is known from FIG. 5, a range where the effect can be confirmed by an actual car corresponds to a region of 55 to 100% of H from the bead core center Q.

Figure 6:
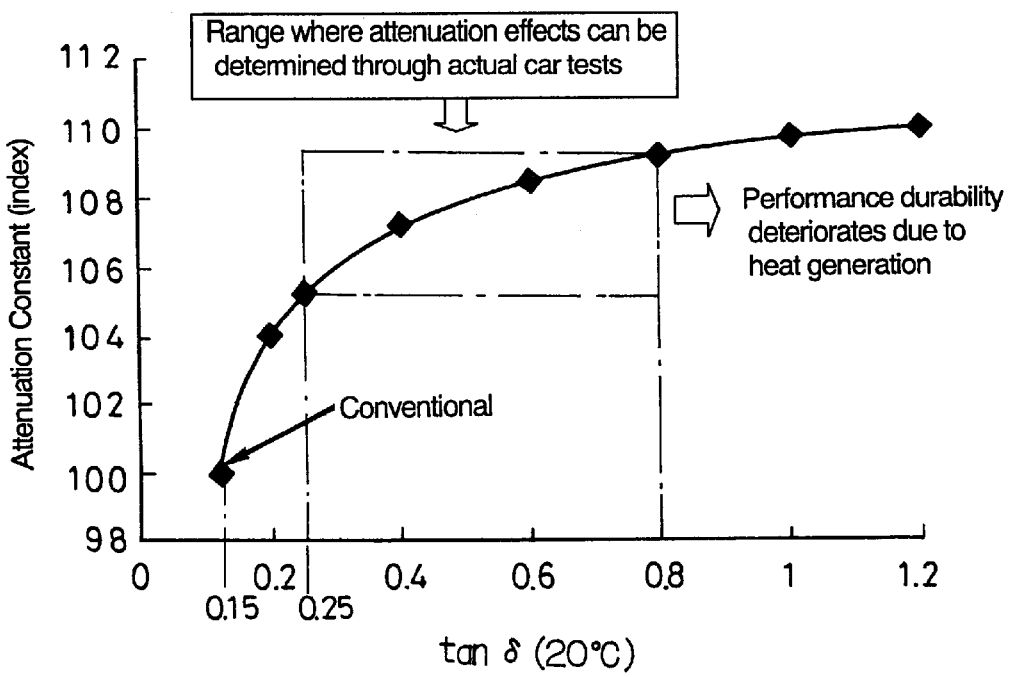
FIG. 6 is a graph showing a relation between tan δ(20° C.) of an inner layer in a side portion of the tire and the attenuation constant (exponent).

The internal layer 11 is composed of a compound showing tan δ(20° C.) 0.25 to 1.00, preferably tan δ (20° C.) 0.25 to 0.8. The compound shows high attenuation. A relation between tan δ(20° C.) and an attenuation constant (exponent) is shown in FIG. 6. As the attenuation constant is larger, an attenuation effect is higher. As is known from FIG. 6, although a range which can be confirmed by an actual car is tan δ(20 ° C.) 0.25 to 0.8, a range where the attenuation constant essentially increases is up to tan δ (20° C.) 1.00. Accordingly, in the present invention, the range where the attenuation effect can be confirmed is set to tan δ(20 ° C.) 0.25 to 1.00. When the range exceeds tan δ(20° C.) 1.00, a durability of performance is deteriorated owing to generation of heat. Moreover, this compound should have 200% modulus of 7.0 to 15.0 MPa. If the 200% modulus is less than 7.0 MPa, a stiff feeling of the tire cannot be obtained. If the 200% modulus exceeds 15.0 MPa, the stiff feeling is too much, thus deteriorating a driving stability.

The outer layer 12 is made of a compound showing tan δ(20 ° C.) 0.15 to 0.20. This compound is known as the compound disposed at the side portion of the tire. Specifically, the side portion of the tire is exposed directly to sunshine, and hence the side portion thereof has to show a strong weathering. In addition, in the case of the tire for a rally, its side portion is apt to be damaged by cutting when a car loading this tire runs on a rough road such as a wasteland, and hence the tire must show an excellent cut resistance. This compound constituting the outer layer 12 shows an excellent weathering and an excellent cut resistance, and has been used as the compound for constituting the side portion of the tire. This compound should have 200% modulus ranging from 4.0 to 6.5 MPa.

A ratio A/B of a volume A of the inner layer 11 to a volume B of the outer layer 12 should be 1/0.4 to 1/1.8. The reason of this is that a situation in which one volume is too larger or smaller than the other is not preferable. It is satisfactory that a thickness of the inner layer 11 is 1 mm or more.

Futhermore, as shown in FIG. 1, a plurality of ribs 13, each being continuous in the circumferential direction of the tire, should be formed so as to be positioned at intervals in the radial direction of the tire. If the ribs 13 are formed in this manner, when one rib 13 suffers the cutting scratch, a growth of the cutting scratch so as to reach other ribs 13 can be prevented. Thus, the cut resistance of the tire is improved. The plurality of ribs 13 make so called a bellows shape, and hence a radial spring constant is reduced, thus improving ride comfort and ground contact properties. It is satisfactory that the ribs 13 are made of the same compound as that constituting the outer layer 12.

Figure 2:
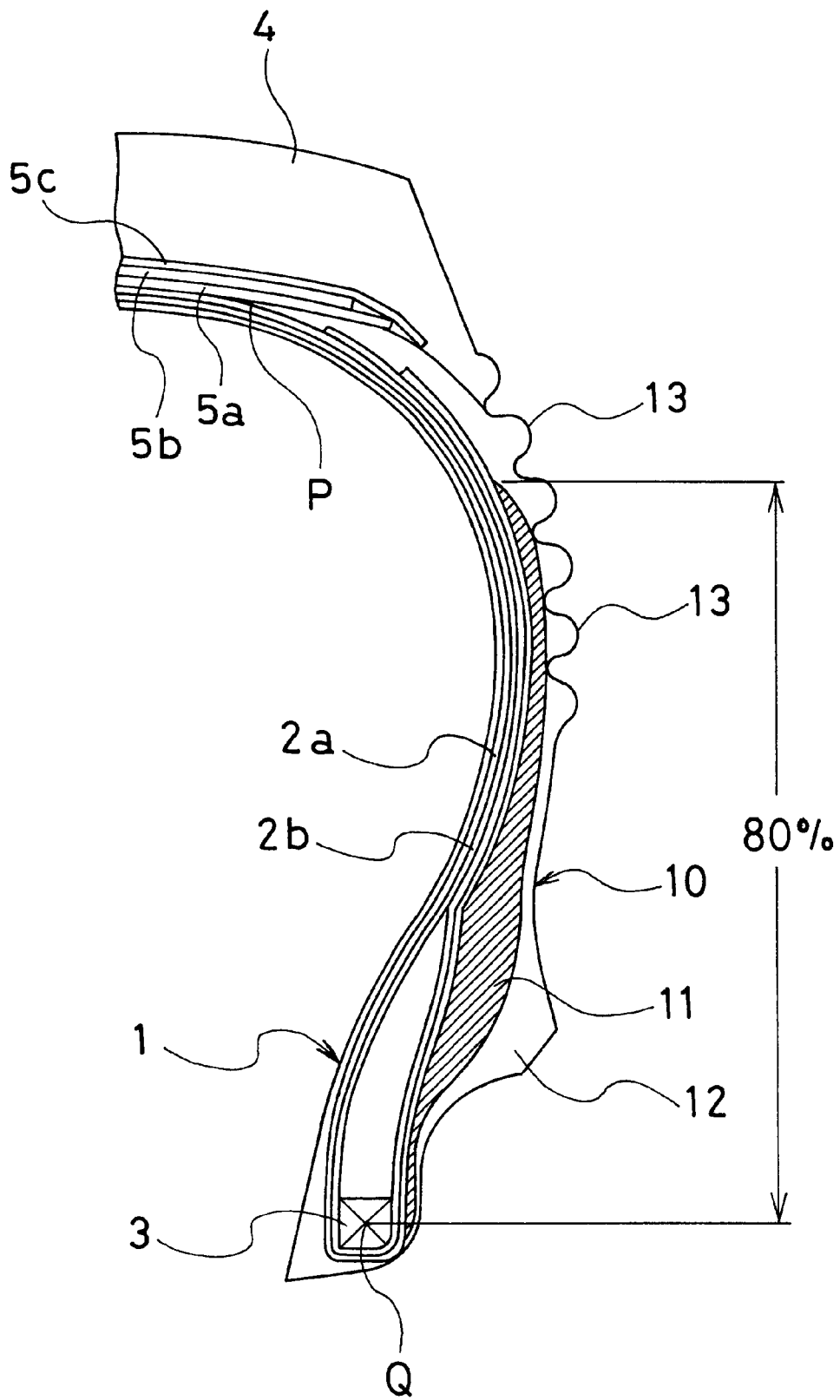
FIG. 2 is a semi cross-sectional view in the meridian direction showing another example of a principal part of a pneumatic tire for a rally of the present invention.
Figure 3:
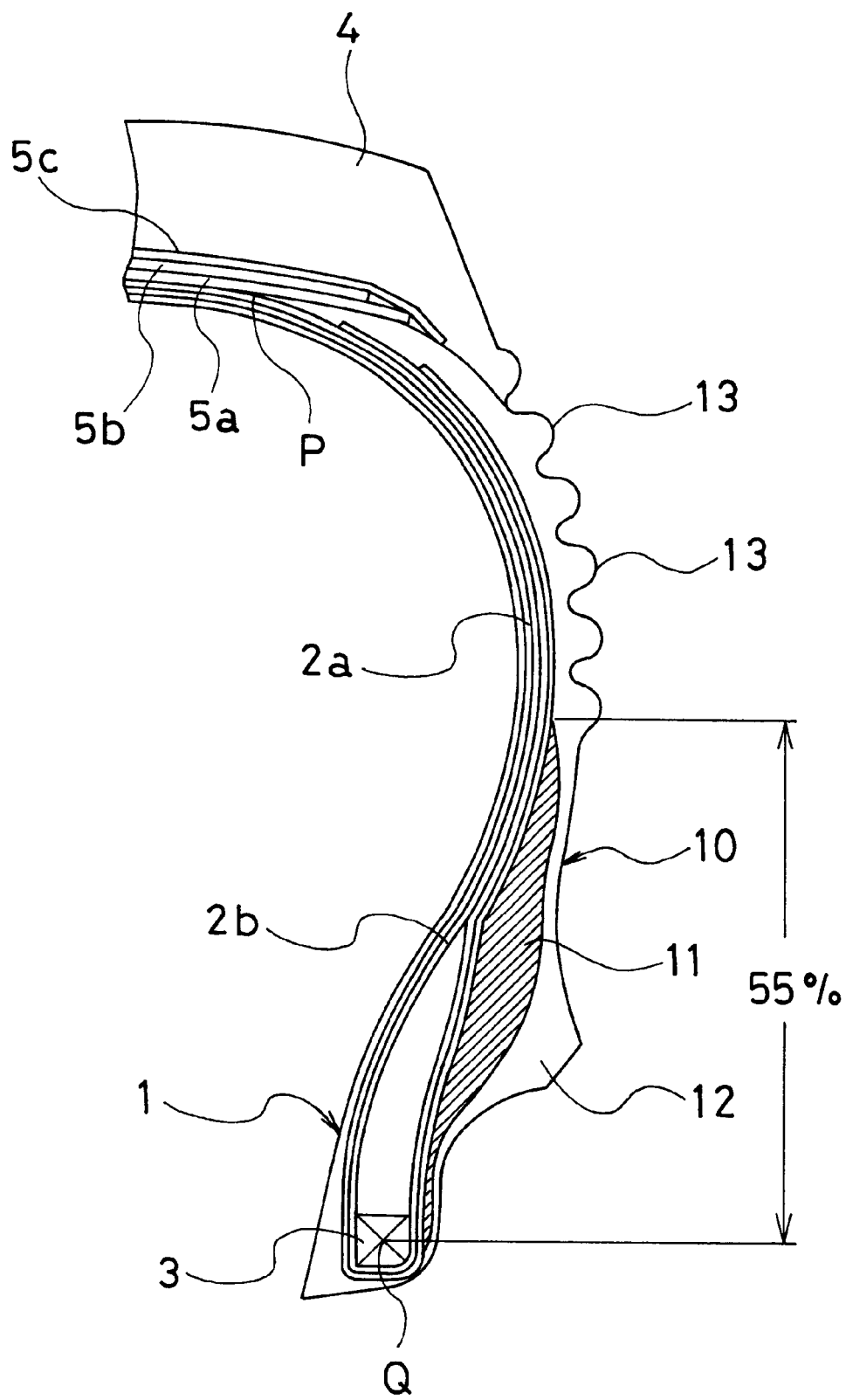
FIG. 3 is a semi-cross sectional view in the meridian section showing still another example of a principal part of a pneumatic tire for a rally of the present invention.
Figure 4:
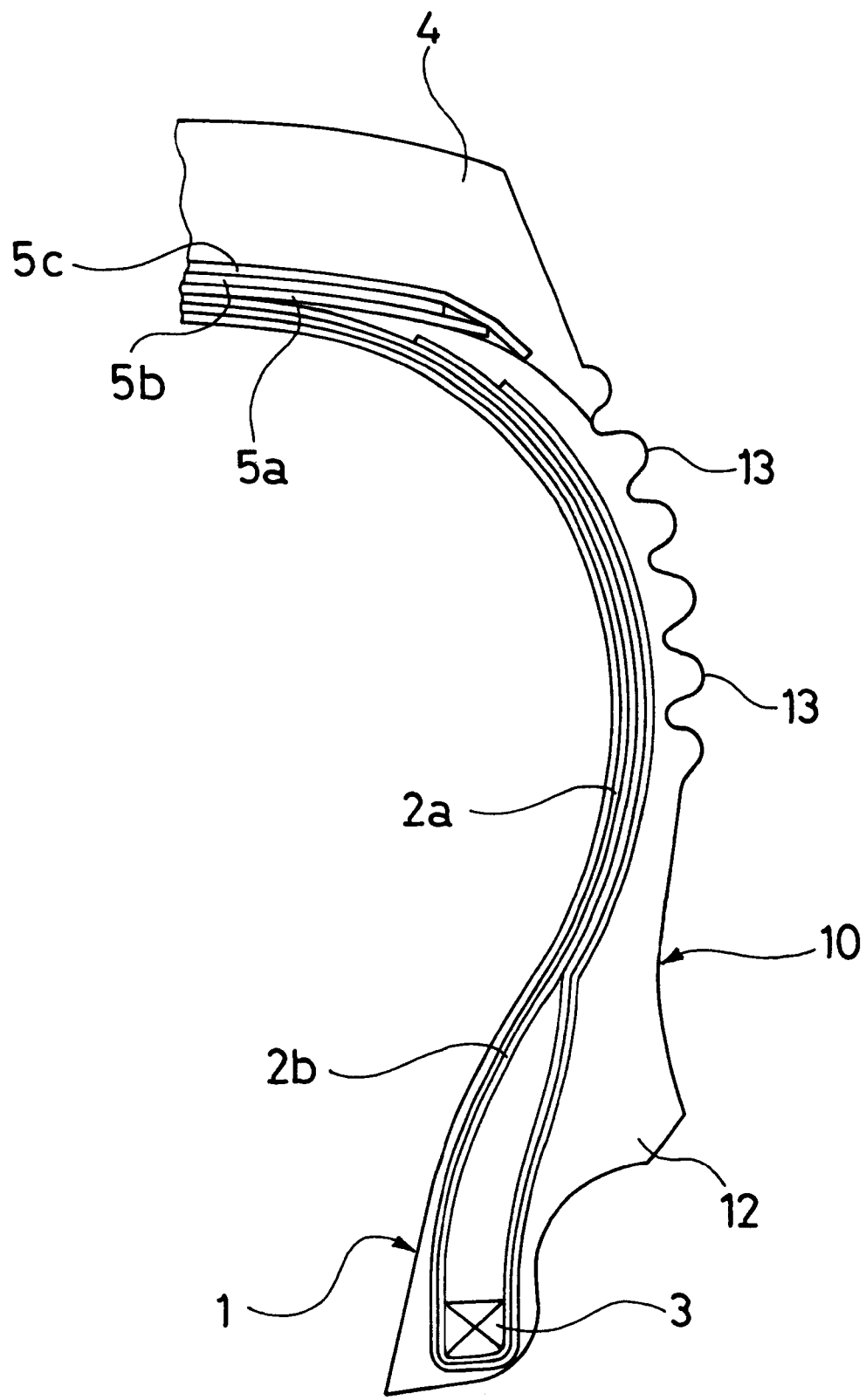
FIG. 4 is a semi-cross-sectional view in the meridian direction showing still another example of a principal part of a pneumatic tire for a rally of the present invention.

FIG. 2 shows another example of the pneumatic tire of the present invention for a rally. In this example, the side portion 10 occupies 80% of H from the bead core center Q. FIG. 3 shows still another example of the pneumatic tire of the present invention for a rally, in which the side portion 10 occupies 55% of H from the bead core center Q. FIG. 4 shows a conventional pneumatic tire for a rally. In this conventional pneumatic tire, the side portion 10 occupying the region that is 100% of H from the bead core center Q is constituted by the outer layer 12 made of a compound showing tan δ(20° C.) 0.15 to 0.20 without providing an inner layer.

EXAMPLE (1) Concerning the tire for a rally, which has a tire size of 195/65R15 and a tire structure shown in FIG. 1, wherein the inner layer 11 was made of a compound showing tan δ(20° C.) 0.26 and 200% modulus 13.6 MPa, the outer layer 12 was made of a compound showing tan δ(20° C.) 0.18 and 200% modulus 4.5 MPa, and a height from the center position of the bead core of the side portion 10 relative to H was changed as shown in Table 1, a feeling test was carried out in the following manner, and an average running time obtained by averaging four running times was measured Then, a driving stability was evaluated. The evaluation results are shown in Table 1.

Feeling Test

The tire for a rally was loaded on a car, and the car ran by 2 km on a dart course. The driving stability was evaluated by classifying it into five stages by a test driver. "5" means the most excellent stage, and "1" means the most poor stage. The stage of "3" or more was evaluated as effective.

Average Time of Four Times Running

The tire for a rally was loaded onto a car, and the car ran by 2 km on the dart course four times. At this time, an average time was measured. As the average time is shorter, the driving stability is more excellent.

TABLE 1

| Height of Side Portion relative to H (%) | 0 | 20 | 40 | 55 | 60 | 80 | 100 |
|---|---|---|---|---|---|---|---|
| Feeling Test (5 stages) | 1 | 1 | 2 | 4 | 5 | 5 | 5 |
| Average Time of Four Times Running | 2' 01" 50 | 2' 01" 48 | 2' 00" 89 | 2' 00" 23 | 1' 59" 92 | 1' 59" 77 | 1' 59" 67 |

As is clear from Table 1, the steering feeling is good in the region extending 55% to 100% of H from the bead core center Q, and the average time of four running times is short. Thus, it is known that the driving stability is excellent. Accordingly, it is turned out that an improvement of attenuation properties of a tire bearing body contributes to an improvement of the driving stability.

(2) Concerning the tire for a rally, which has a tire size of 195/65R15 and a tire structure shown in FIG. 2, wherein the inner layer 11 was made of a compound showing 200% modulus 13.6 MPa in the region occupying 80% of H from the bead core center Q, the outer layer 12 was made of a compound showing tan δ(20° C.) 0.18 and 200% modulus 4.5 MPa (a thickness of the thinnest portion of the inner layer 11 is 3 mm), and tan δ(20° C.) of the inner layer 11 was changed as shown in Table 2, the feeling test was carried out in the same manner as the above-described (1), and the average running time obtained by averaging four running times was measured. Then, the driving stability was evaluated. The evaluation rests are shown in Table 2.

TABLE 2

| Tan δ (20° C.) | 0.10 | 0.15 | 0.25 | 0.45 | 0.60 | 1.00 | 1.20 |
|---|---|---|---|---|---|---|---|
| Feeling Test (5 stages) | 1 | 2 | 3 | 4 | 5 | 5 | 2 |
| Average Time of Four Times Running | 2' 01" 34 | 2' 00" 77 | 2' 00" 23 | 1' 59" 81 | 1' 59" 64 | 1' 59" 67 | 2' 00" 52 |

As is clear from Table 2, the steering feeling is good in tan δ(20° C.) 0.25 to 1.00, and the average time of four running times is short. Thus, it is known that the driving stability is excellent. Accordingly, it is turned out that an improvement of attenuation properties of a tire bearing body contributes to an improvement of the steering stability. Note that at the time when tan δ(20 ° C.) is equal to 1.20, it was pointed out that a durability of a tire performance is deteriorated owing to generation of too much heat.

(3) Concerning the tire for a rally, which has a tire size of 195/65R15 and a tire structure shown in FIG. 2, wherein the inner layer 11 was made of a compound showing tan δ(20 ° C.) 0.30 in the region occupying 80% of H from the bead core center Q, the outer layer 12 was made of a compound showing tan δ(20° C.) 0.18 and 200% modulus 4.5 MPa (a thickness of the thinnest portion of the inner layer 11 was 3 mm), and 200% modulus of the inner layer 11 was changed as shown in Table 3, the feeling test was carried out in the same manner as the above described (1), and the average running time obtained by averaging four running times was measured. Then, the driving stability was evaluated. The evaluation results are shown in Table 3.

TABLE 3

| 200% modulus (MPa) | 4 | 7 | 10 | 13 | 15 | 20 |
|---|---|---|---|---|---|---|
| Feeling Test (5 stages) | 2 | 4 | 5 | 5 | 4 | 2 |
| Average Time of Four Times Running | 2' 01" 21 | 2' 00" 02 | 1' 59" 94 | 1' 59" 78 | 2' 00" 11 | 2' 01" 34 |

As is clear from Table 3, the steering feeling is good in 200% modulus 7 to 15 MPa, and the average time of four running times is short. Thus, it is known that the driving stability is excellent. Accordingly, it is turned out that an improvement of attenuation properties of a tire bearing body contributes to an improvement of the driving stability.

Moreover, in the above-described test (1) to (3), since the outer layer 12 is made of the known compound used for constituting the side portion of the conventional tire, which shows tan δ(20° C.) 0.18 and 200% modulus 4.5 MPa and is excellent in cut resistance and weathering, the cut resistance and weathering of the side portion are never deteriorated.

As described above, according to the present invention, in the pneumatic tire for a rally in which the carcass layer is provided in each of the pair of bead portions and the plurality of belt layers are arranged outside the carcass layer in the tread, the tire is loaded on the standard rim, the vertical distance from the position of the end P in the tire width direction in a region where the first belt layer among the plurality of belt layers provided between the carcass layer and the tread and the carcass layer contact to each other to a position of the bead core center of the bead portion 1 is set to H when internal pressure of 10% of the maximum air pressure is charged. The side portion extending at the region occupying of 55 to 100% of H from the bead core center Q of the bead portion is constituted by the inner layer made of the compound showing tan δ(20° C.) 0.25 to 1.00, disposed on the outside of the carcass layer, and the outer layer made of the compound showing tan δ(20° C.) 0.15 to 0.20, disposed on the outside of the inner layer. Thus, it is possible to improve attenuation properties without deteriorating cut resistance and weathering in the side portion.

Although the preferred embodiment of the present invention has been described in detail, it should be understood that various changes, substitutions and alternations can be made therein without departing from spirit and scope of the invention as defined by the appended claims.

What is claimed is:

1. A pneumatic tire in which a carcass layer is provided in each of a pair of bead portions, and a plurality of belt layers are arranged outside the carcass layer in a tread, wherein a tire is loaded on a standard rim, a vertical distance from a position of an end in a tire width direction in a region where a first belt layer among a plurality of belt layers between the carcass layer and the tread and the carcass layer contact to each other to a bead core center of the bead portion is set to H when internal pressure of 10% of the maximum air pressure is charged, a side portion extending 55 to 100% of H from a bead core center Q of a bead portion is constituted by an inner layer, made of a compound showing tan δ at 20° C. of 0.25 to 1.00, disposed on the outside of the carcass layer and an outer layer, made of a compound showing tan δ at 20° C. of 0.15 to 0.20, disposed on the outside of the inner layer.

2. The pneumatic tire according to claim 1, wherein the compound constituting said inner layer shows 200% modulus of 7.0 to 15.0 MPa, and the compound constituting said outer layer shows 200% modulus of 4.0 to 6.5 MPa.

3. The pneumatic tire according to claim 1, wherein a plurality of ribs, each being continuous in a circumferential direction of the tire, are formed so as to be positioned at intervals in a radial direction of the tire.

4. The pneumatic tire according to claim 1, wherein a ratio A/B of a volume A of said inner layer to a volume B of said outer layer is 1/0.4 to 1/1.8.

5. A pneumatic tire according to any one of claims 1 to 4 wherein the tire is a rally tire.

* * * * *